UNITED STATES PATENT OFFICE.

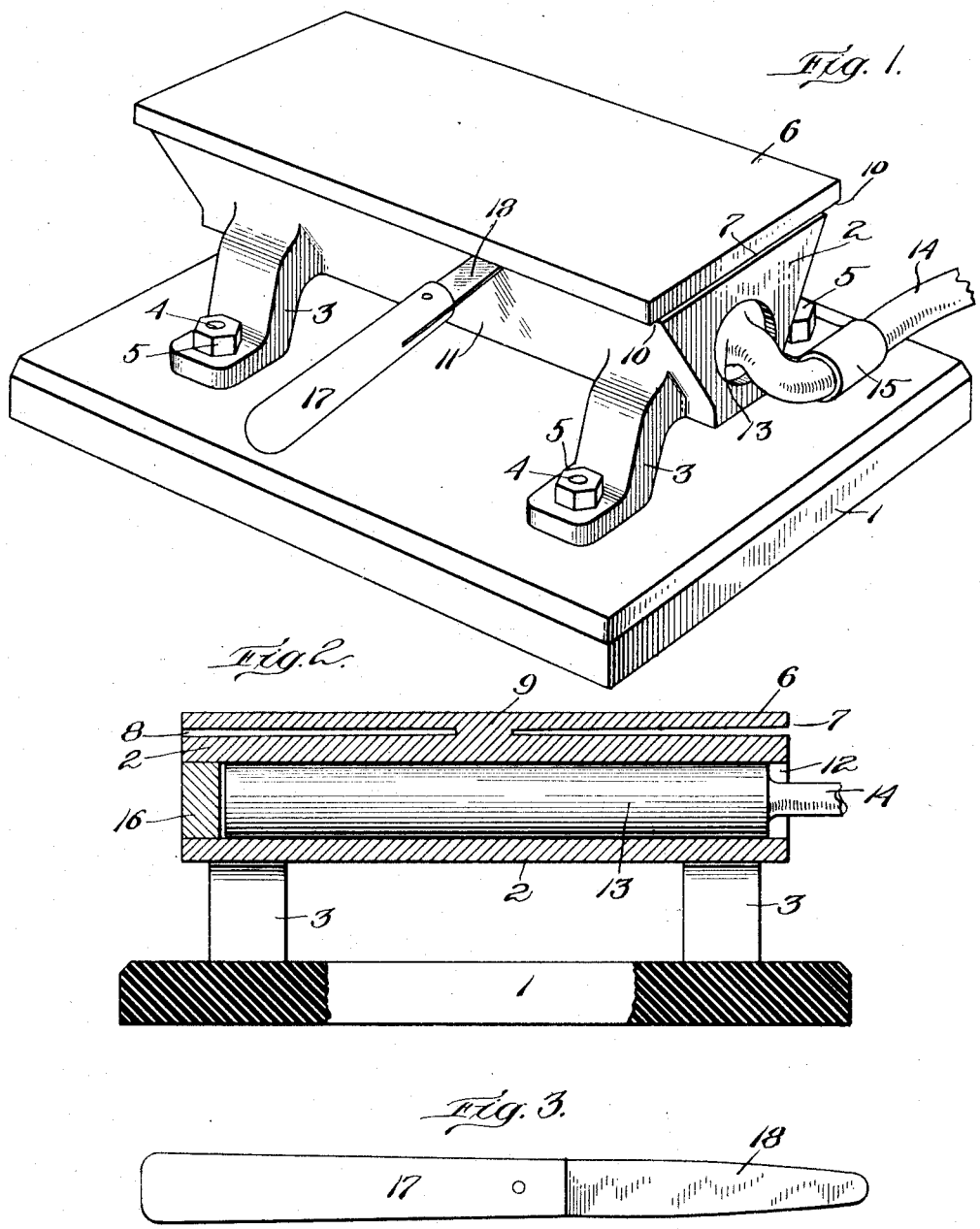

EDWIN N. CHANDLER, OF BRAINTREE, MASSACHUSETTS.

ELECTRIC KNIFE-HEATER.

1,193,121. Specification of Letters Patent. Patented Aug. 1, 1916.

Application filed July 29, 1914. Serial No. 853,793.

*To all whom it may concern:*

Be it known that I, EDWIN N. CHANDLER, a citizen of the United States, and resident of Braintree, county of Norfolk, State of Massachusetts, have invented an Improvement in Electric Knife-Heaters, of which the following description, in connection with the accompanying drawings, is a specification, like letters on the drawings representing like parts.

My present invention is an improved electric knife heater, intended primarily for use in heating shoe operatives' knives which are used in repairing, smoothing and working on shoes, especially on patent leather shoes. In using such knives, it is necessary that they be heated to a proper degree, suitable for the particular work in hand, and it has heretofore been customary to either hold the knife in a gas flame, blackening it, securing uneven degrees of heat on successive operations, and with the fire risk attendant on a flame, or to use a spring tensioned electric heater, such as illustrated in my prior Patent 893,783. My present knife heater, however, is a much simpler and more economical heating device, and has the added advantage, over the heater of my prior patent, of enabling a considerable mass of metal, on both sides of the knife, to become heated at just the right temperature by means of a detachable electric heating unit. The advantage of such detachable heating unit is very important, as the entire metallic part of my knife heater can be made as a single casting, with the recess for the heater cored out therein, and then shipped long distances without danger of damage or injury, and it can be instantly set up and fitted with an ordinary standard type of electrical heating unit.

As shown in the annexed drawings, my improved knife heater comprises a very simple stand with a recess for the heating core extending substantially throughout its entire length, and in just the right position for conserving all the heat units derived from such expensive current as electricity.

Furthermore, a feature of the invention resides in having a slot to receive the knife blade with an overhanging portion to act as a guide against which the edge or end of the knife may contact, in order to facilitate its being positioned in the heating slot.

Referring to the drawings, illustrating a preferred embodiment of my present knife heater, Figure 1 is a view in perspective of the apparatus with a knife in position; Fig. 2 is a cross sectional view; and Fig. 3 is a plan view of an ordinary shoe repairer's knife for use in work in repairing on patent leather shoes.

I prefer to make my present knife heater as a small compact apparatus mounted on an insulated base 1 of wood, rubber, fiber, or the like, to which the knife heater is secured. This heater comprises a metallic stand 2 having cast thereon a plurality of supporting legs 3 secured to the base 1 by bolts 4 and nuts 5, or in any other appropriate manner. The stand 2 has a top portion 6, preferably formed integrally with the stand 2 and having slots 7 and 8 sawed therein from either end toward the center, leaving the web 9 integral with the top 6 and stand 2. If desired, the top 6 could be made separately and secured to the stand 2, substantially as illustrated in the drawings, but I prefer to use a solid integral web 9, approximately as shown. I also prefer to form the top 6 with a slightly overhanging or projecting portion, as indicated at 10, in Fig. 1, so that, as the knife is slid upwardly along the side 11 of the stand 2, it will strike against the overhanging edge 10 of the top 6 and thus facilitate the operator's sliding same in the slot. I also prefer to make the slots 7 and 8 slightly tapering from outwardly toward the web 9, as clearly indicated in Fig. 2, so that the same will have provision to receive knife blades of different thicknesses, and by simply moving the knife along either slot in which it is positioned, it will soon contact with both the top 6 and stand 2 and thus be heated on both sides. The top 6 and stand 2 are also of sufficiently heavy metal, so that they will retain considerable heat, and thus be able to radiate heat to both sides of the knife blade.

The stand 2 is formed with a recess 12, which may be cored therein when the device is cast, or formed in any other convenient manner, as by being bored out of a solid piece. This recess 12 is intended to be of appropriate diameter and length to receive the heating unit 13, which is connected by wires 14 to any adjacent source of electrical power. I also prefer to arrange a bracket 15 secured to one of the bolts 4 and nuts 5 holding one of the legs 3 to the base of the device, so as to afford a proper lead for the wires 14, and also to prevent the core 13 being accidentally removed from the apparatus. I may fit the end of the recess 12 with a plug 16 at the end opposite to that in which the wires 14 are connected with the heating unit, as also illustrated in Fig. 2. An ordinary shoe repairer's knife 17, having a thin blade 18, is shown in position in Fig. 1, and also in an enlarged view in Fig. 3. Such knives are of wellknown size and length, and contain a narrow tapering blade which must be continually heated when in use. The wires 14 may be connected with a rheostat to supply any desired degree of heat to the unit 13, as will be readily understood.

My present knife heater is of extremely simple form, very economical to manufacture and being preferably built of relatively heavy metal, is almost indestructible, while the removable heating unit can be renewed as often as desired. Furthermore, the knife heater can be packed and shipped at a minimum expense, and without danger of injury, while it can be instantly set up and any person can apply the heating unit 13 thereto, and the apparatus is then ready for use. By having the top portion 6 of relatively unyielding metal and with its marginal portion overhanging, and the slots 7 and 8 tapering, the apparatus will automatically receive and hold knives having blades of different thicknesses and any of such knives can be quickly positioned in the slots by the guiding overhanging top portion.

Having described my invention, what I claim as new and desire to secure by Letters Patent is:

1. A knife heater, comprising a metallic stand with a cored recess therein longitudinally of said stand to receive a removable heating unit, a top portion united with said stand and spaced therefrom, adapted to receive a plurality of knife blades between said top and stand.

2. A knife heater, comprising a metallic stand with a core recess therein longitudinally of said stand to receive a removable heating unit, an overhanging top portion united with said stand, and spaced therefrom, adapted to receive a plurality of knife blades between said top and stand.

3. A knife heater, comprising a metallic stand with a cored recess therein longitudinally of said stand to receive a removable heating unit, an overhanging top portion united with said stand and spaced therefrom, to provide a tapering slot adapted to receive knife blades of different thicknesses therein.

4. A knife heater, comprising a metallic stand with a cored recess therein longitudinally of said stand to receive a removable heating unit, an overhanging top portion united with said stand at approximately the transverse center portion thereof and spaced therefrom either side of said center portion, adapted to receive a plurality of knife blades between said top and stand.

5. A knife heater, comprising a metallic stand with a cored recess therein longitudinally of said stand to receive a removable heating unit, an overhanging top portion united with said stand at approximately the transverse center portion thereof and spaced therefrom either side of said center portion to form tapering slots adapted to receive knives of different thicknesses, in combination with a guide to receive the supply wires for heating coil and retain said coil in said recess.

In testimony whereof, I have signed my name to this specification, in the presence of two subscribing witnesses.

EDWIN N. CHANDLER.

Witnesses:
JAMES R. HODDER,
R. G. HERSEY.

Copies of this patent may be obtained for five cents each, by addressing the "Commissioner of Patents, Washington, D. C."